US012640677B1

(12) United States Patent (10) Patent No.: US 12,640,677 B1
Gao (45) Date of Patent: May 26, 2026

(54) SOLAR PHOTOVOLTAIC PANEL DEVICE

(71) Applicant: Haiying Gao, Shantou (CN)

(72) Inventor: Haiying Gao, Shantou (CN)

( * ) Notice: Subject to any disclaimer, the term of this patent is extended or adjusted under 35 U.S.C. 154(b) by 0 days.

(21) Appl. No.: 19/393,767

(22) Filed: Nov. 19, 2025

(30) Foreign Application Priority Data

Oct. 28, 2025 (CN) .......................... 202522279372.9

(51) Int. Cl.
H02S 20/30 (2014.01)
H02S 40/38 (2014.01)

(52) U.S. Cl.
CPC .............. H02S 20/30 (2014.12); H02S 40/38 (2014.12)

(58) Field of Classification Search
None
See application file for complete search history.

(56) References Cited

U.S. PATENT DOCUMENTS 4,611,090 A * 9/1986 Catella ................... F24S 25/12
136/258

* cited by examiner

*Primary Examiner* — Eli S Mekhlin
(74) *Attorney, Agent, or Firm* — HOWARD M COHN and Associates, LLC

(57) ABSTRACT

A solar photovoltaic panel device is provided, including a bottom housing and a PV panel. The bottom housing includes a mounting surface and at least one adhesive groove, a central portion of the mounting surface is recessed inward to form a mounting recess, and the at least one adhesive groove is defined on the mounting surface and surrounds an outer periphery of an opening of the mounting recess. At least one adhesive body is disposed in the at least one adhesive grooves. The PV panel is fixed to the mounting surface via the at least one adhesive body and cover the mounting recess.

15 Claims, 5 Drawing Sheets

SOLAR PHOTOVOLTAIC PANEL DEVICE

TECHNICAL FIELD

The present disclosure relates to a technical field of solar photovoltaic (PV) panel devices, and in particular to a solar PV panel device.

BACKGROUND

A solar photovoltaic (PV) panel is a device composed of photovoltaic materials, such as silicon or thin films, a primary function of which is to convert solar energy into electrical energy. In the prior art, solar PV panel devices are typically assembled from multiple discrete components. For example, a conventional solar PV panel device may include a PV panel, a metal bracket or frame for supporting the PV panel, a battery enclosure, an outer housing, and other associated components.

Because the conventional solar PV panel device consists of numerous parts, a manufacturing process is complicated and an assembly procedure is cumbersome. For example, a support structure must be installed first, followed by mounting the PV panel onto the support structure, and then connecting and securing external components, such as a junction box and the battery enclosure. As a result, installation efficiency is relatively low.

SUMMARY

Embodiments of the present disclosure provide a solar photovoltaic (PV) panel device with improved production efficiency and assembly efficiency.

The embodiments of the present disclosure provides the solar PV panel device, including a bottom housing and a PV panel. The bottom housing includes a mounting surface and at least one adhesive groove, a central portion of the mounting surface is recessed inward to form a mounting recess, and the at least one adhesive groove is defined on the mounting surface and surrounds an outer periphery of an opening of the mounting recess. At least one adhesive body is disposed in the at least one adhesive grooves. The PV panel is fixed to the mounting surface via the at least one adhesive body and cover the mounting recess.

In some embodiments, the at least one adhesive groove forms a continuous loop.

In some embodiments, the PV panel is rectangular, and the at least one adhesive groove is a rectangular adhesive groove corresponding thereto.

In some embodiments, the at least one adhesive groove includes two adhesive grooves, and the two adhesive grooves include a first rectangular adhesive groove and a second adhesive groove. The first rectangular adhesive groove and the second rectangular adhesive groove are concentrically arranged and spaced apart from each other.

In some embodiments, a distance between an outer edge of the first rectangular adhesive groove and an outer edge of the PV panel is not greater than 10 mm.

In some embodiments, a distance between an inner edge of the second rectangular adhesive groove and the opening of the mounting recess is not greater than 10 mm.

In some embodiments, the bottom housing further includes at least one adhesive overflow groove, and the at least one adhesive overflow groove is communicated with the at least one adhesive groove.

In some embodiments, the at least one adhesive overflow groove includes adhesive overflow grooves, and the adhesive overflow grooves are spaced apart along a circumferential direction of the at least one adhesive groove.

In some embodiments, a depth of the at least one adhesive overflow groove is not greater than a depth of the at least one adhesive groove.

In some embodiments, a support structure protrudes from a bottom wall of the mounting recess, and a top portion of the support structure abuts against a lower surface of the PV panel.

In some embodiments, the solar PV panel further includes at least one battery and a circuit board, the at least one battery and the circuit board are disposed in the mounting recess and are respectively electrically connected to the PV panel. The bottom housing further includes a protruding plate, the protruding plate is connected to a bottom wall of the mounting recess to define a battery compartment for accommodating the at least one battery. The support structure includes at least one support plate, the at least one support plate is connected to a top portion of the protruding plate, and a top surface of the at least one support plate abuts against the lower surface of the PV panel.

In some embodiments, the support structure includes at least one support post, a top portion of the at least one support post abuts against the lower surface of the PV panel.

In some embodiments, the bottom housing further includes a charging interface, and the charging interface is electrically connected to the circuit board.

In some embodiments, the solar PV panel device further includes a flexible sealing member, and the flexible sealing member is configured to close or open the charging interface.

In some embodiments, the mounting surface further includes a retaining wall disposed radially outward of the at least one adhesive groove. The retaining wall cooperates with the mounting surface to define an assembly groove for accommodating the PV panel.

In some embodiments, an upper surface of the PV panel does not protrude above an upper surface of the retaining wall.

In some embodiments, a cross-section of the at least one adhesive groove is one of a trapezoidal shape, a V shape, and a rectangular shape.

According to the solar PV panel device of the present embodiment, an overall housing structure of the solar PV panel device is generally formed by the bottom housing and the PV panel. The bottom housing is manufactured by an integrally molded process, which may significantly enhance production efficiency and effectively reduce manufacturing costs. The bottom housing includes the mounting recess, and the at least one battery and the circuit board are disposed in the mounting recess. The PV panel is securely fixed to the mounting surface of the bottom housing via the at least one adhesive body. Such fixation method not only simplifies an assembly operation and improves installation efficiency, but also ensures a tight and firm connection between the PV panel and the bottom housing. Furthermore, the PV panel covers the opening of the mounting recess, thereby providing effective protection for electronic components, such as the at least one battery and the circuit board disposed in the mounting recess. Such protection reduces exposure of the electronic components to external factors, such as dust and moisture, thereby prolonging service life of these electronic components.

BRIEF DESCRIPTION OF DRAWINGS

To more clearly illustrate embodiments of the present disclosure or technical solutions in the prior art, accompanying drawings required in description of the embodiments or the prior art are briefly described below, and obviously, the accompanying drawings in the following description are merely some embodiments of the present disclosure, and for those who skilled in the art, other drawings may be obtained according to structures shown in these drawings without creative efforts.

Figure 1:
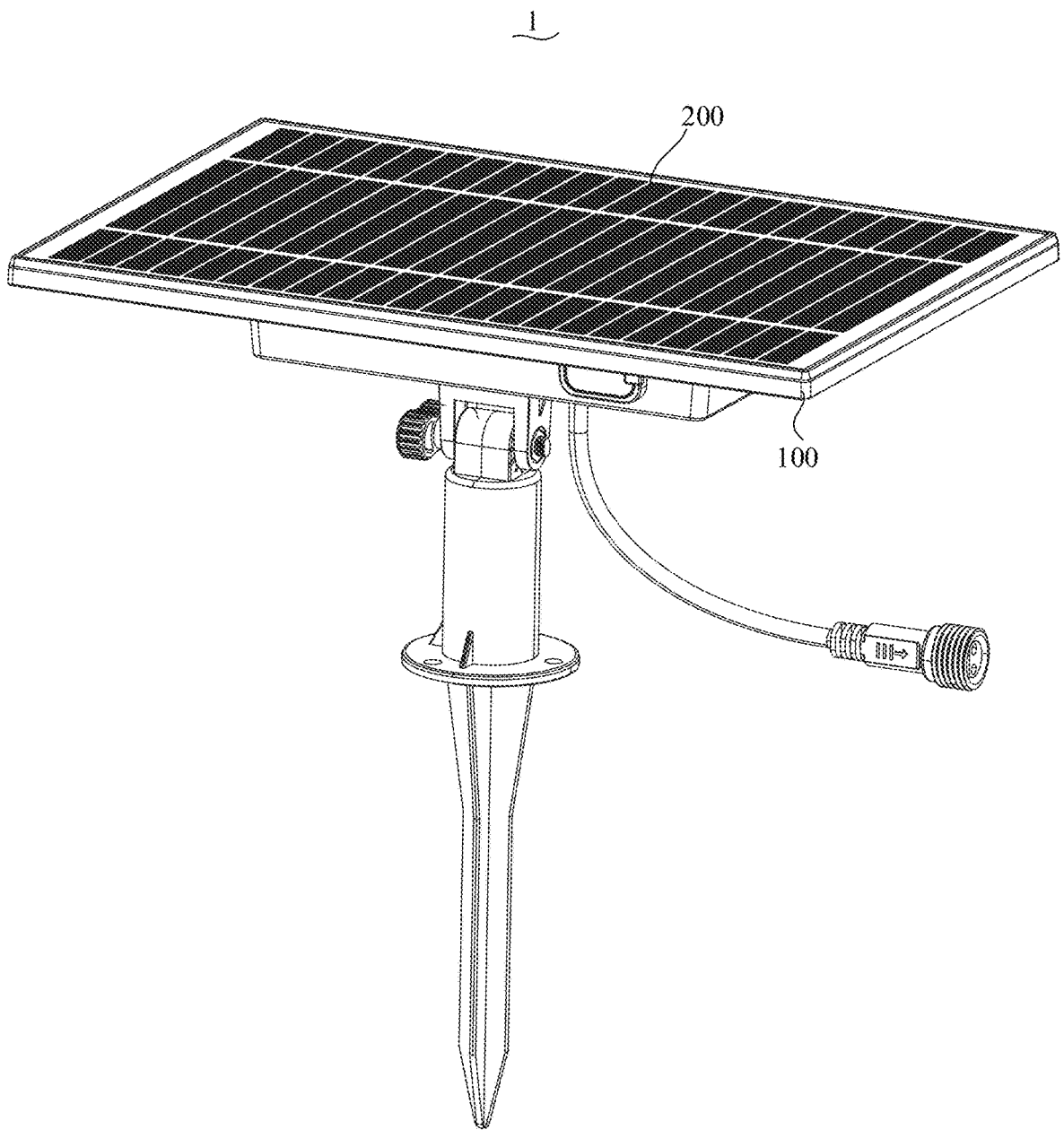
FIG. 1 is a structural schematic diagram of a solar photovoltaic (PV) panel device according to the present disclosure.

Reference numerals in the drawings: 1. solar PV panel device; 100. bottom housing; 110. mounting surface; 120. mounting recess; 121. battery compartment; 122. protruding plate; 130. adhesive groove; 131. first rectangular adhesive groove; 32. second rectangular adhesive groove; 133. adhesive overflow groove; 140. support structure; 141. support plate; 142. support post; 150. charging interface; 180. retaining wall; 190. assembly groove; 200. PV panel; 400. battery; 500. circuit board; 600. flexible sealing member.

Implementations, functional features, and advantages of the present disclosure are further described with reference to the accompanying drawings in combination with the embodiments

DETAILED DESCRIPTION OF EMBODIMENTS

To better understand technical solutions of the present disclosure, embodiments of the present disclosure are described in detail below with reference to accompanying drawings.

When following description refers to the accompanying drawings, unless otherwise indicated, the same numbers in different drawings represent the same or similar elements. Implementations described in following exemplary embodiments do not represent all implementations consistent with this application. Instead, they are merely examples of apparatuses and methods consistent with some aspects of the present disclosure as recited in appended claims.

In the description of the present disclosure, it should be understood that terms "first", "second", etc. are only used for descriptive purposes, and cannot be understood as indicating or implying relative importance. Those who skilled in the art would understand specific meanings of the foregoing terms in the present disclosure according to specific situations. In addition, in the description of the present disclosure, unless otherwise stated, "a plurality of" means two or more, "and/or" used herein is merely an association relationship describing associated objects. For example, A and/or B may indicate three cases that A exists alone, A and B exist, and B exists alone, and a character "/" in the specification generally indicates an "or" relationship between the associated objects Unless otherwise defined, all technical and scientific terms used herein have the same meaning as commonly understood by those who skilled in the art to which the present disclosure belongs. The terms used in the specification are only for the purpose of describing specific embodiments, and are not intended to limit the present disclosure. As used herein, the term "and/or" includes any and all combinations of one or more of associated listed items.

Figure 2:
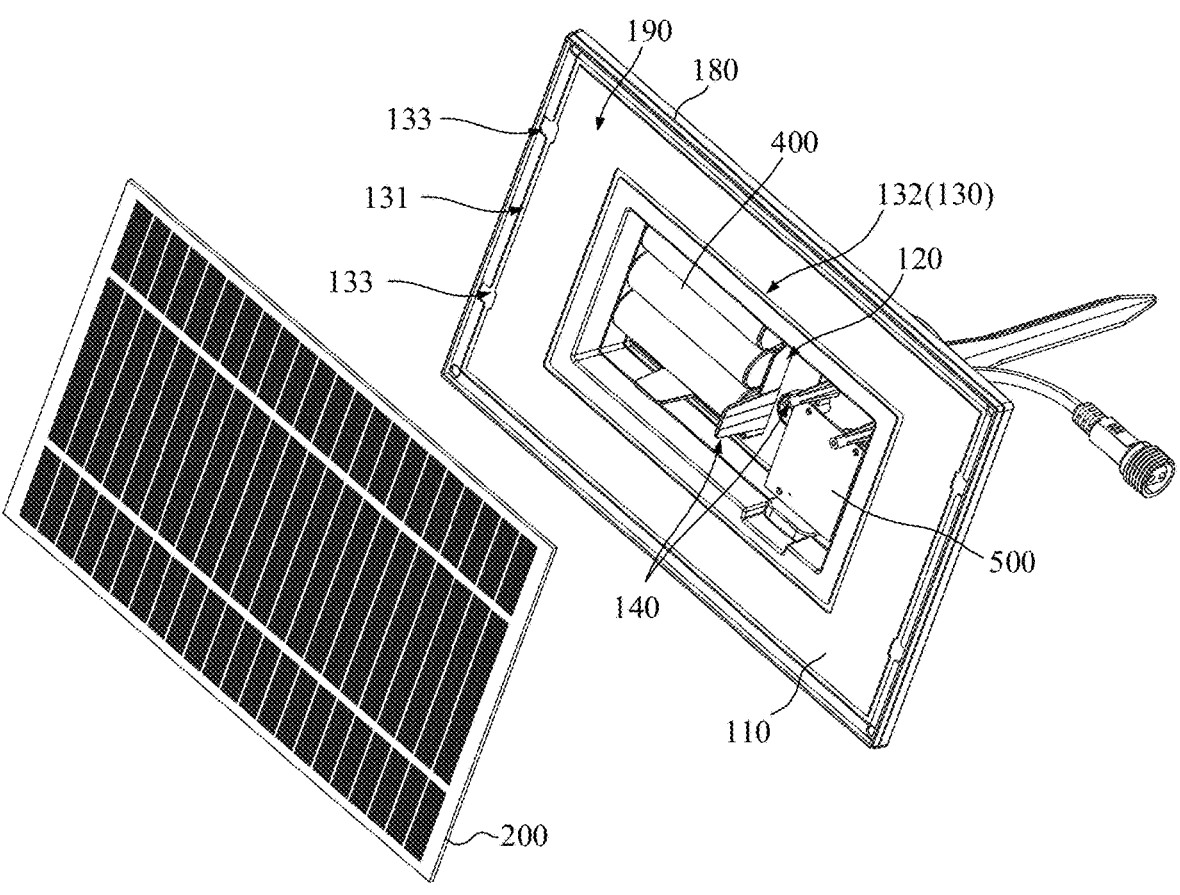
FIG. 2 is a first exploded schematic diagram of the solar PV panel according to one embodiment of the present disclosure.

Please refer to FIGS. 1-2, the embodiments of the present disclosure provides a solar photovoltaic (PV) panel device 1, including a bottom housing 100 and a PV panel 200. The bottom housing 100 serves as a main supporting structure of the solar PV panel device and is made of an engineering plastic, such as, but not limited to, polyamide (PA), polycarbonate (PC), polyoxymethylene (POM), acrylonitrile-butadiene-styrene (ABS), or polybutylene terephthalate (PBT). The bottom housing 100 is manufactured by an injection molding process, which is high in production efficiency. Alternatively, the bottom housing 100 is formed by die-casting using a metal material, such as aluminum alloy or stainless steel. In this way, the bottom housing 100 achieves both good durability and heat dissipation performance. A mounting surface 110 is disposed on a top portion of the bottom housing 100, and the mounting surface 110 is flat. A central portion of the mounting surface 110 is recessed inward to form a mounting recess 120. A projection of the mounting recess 120 on the mounting surface 110 falls within an area covered by the PV panel 200. Specifically, the mounting recess 120 is configured to accommodate core electronic components, such as at least one battery 400 and a circuit board 500.

To facilitate installation of the PV panel 200 on the bottom housing 100, at least one adhesive groove 130 is formed on the mounting surface 110. Please refer to FIG. 2, the at least one adhesive groove 130 surrounds an outer periphery of an opening of the mounting recess 120. The at least one adhesive groove 130 is filled with at least one adhesive body (not shown in the drawings). The PV panel 200, serving both as a power-generating unit and a top cover of the solar PV panel device, is bonded and secured to the mounting surface 110 via the at least one adhesive body. In this way, while the PV panel 200 is firmly fixed, the PV panel 200 also covers the opening of the mounting recess 120, thereby providing a sealed, dust-proof, and water-resistant protective environment for electronic components disposed in the mounting recess 120.

The at least one adhesive body is selected from high-performance adhesives, such as epoxy resin two-component adhesives (AB epoxy), silicone sealants, or polyurethane adhesives, to meet different application requirements. The epoxy resin two-component adhesives exhibit extremely high bonding strength and excellent weather resistance, ensuring a secure fixation of the PV panel 200 to the bottom housing 100. In addition, by incorporating thermally conductive fillers, such as metal oxides, into the epoxy resin AB adhesive, a thermally conductive epoxy adhesive is formed, which facilitates transfer of heat from the PV panel 200 to the bottom housing 100, thereby improving heat dissipation efficiency and prolonging service life of the solar PV panel device. The silicone sealants possess excellent weather resistance and elasticity, effectively compensating for thermal stresses caused by temperature variations and preventing cracking. The polyurethane adhesives exhibit low-temperature resistance and vibration resistance, and also provides good adhesion to a variety of substrate materials.

Please refer to FIG. 2, in some embodiments, the at least one adhesive groove 130 forms a continuous loop. In this way, bonding strength between the PV panel 200 and the mounting surface 110 is improved, while also forming a continuous sealing barrier along the outer periphery of the opening of the mounting recess 120, preventing moisture, dust, and other contaminants from entering the mounting recess 120 and protecting the electronic components therein. A specific shape of the at least one adhesive groove 130 is adapted according to contours of the PV panel 200 and the mounting recess 120. For example, a profile of the continuous loop selected from a circle, an ellipse, a rectangle, a rounded rectangle, or any other regular or irregular polygon, such as a hexagon. Preferably, a shape of the at least one adhesive groove 130 is adapted to an outer contour of the PV panel 200 and/or a shape of the opening of the mounting recess 120. In an exemplary embodiment, both the PV panel 200 and the opening of the mounting recess 120 are rectangular, and the at least one adhesive groove 130 is correspondingly formed as a rectangular groove, thereby optimizing adhesive usage and ensuring uniformity of a sealing path.

In other embodiments, the at least one adhesive groove 130 is configured as a segmented groove, meaning that the at least one adhesive groove 130 is formed from multiple discrete groove segments that are spaced along the outer periphery of the opening of the mounting recess 120. Compared to the continuous loop, such segmented design reduces a total length of the at least one adhesive groove 130, thereby effectively decreasing an amount of adhesive required while still meeting bonding strength requirements. This, in turn, helps reduce material costs and an overall weight of the solar PV panel device. It should be understood that projections of the multiple discrete groove segments on the mounting surface 110 still collectively surround the opening of the mounting recess 120. A specific shape and length of each of the multiple discrete groove segments and a spacing of each adjacent two of multiple discrete groove segments are adaptively designed according to required bonding strength, sealing performance, and process requirements. For example, each of the multiple discrete groove segments is a simple straight section or a curved section; the multiple discrete groove segments are evenly distributed or more densely arranged in corner regions where stress concentration occurs.

To achieve improved bonding and sealing performance, the at least one adhesive groove 130 includes two or more adhesive grooves 130. Please refer to FIG. 2, as an example, two rectangular grooves 130 are provided, and the two rectangular adhesive grooves 130 include a first rectangular adhesive groove 131 and a second rectangular adhesive groove 132, The first rectangular adhesive groove 131 and the second rectangular adhesive groove 132 are concentrically arranged and spaced apart from each other. The first rectangular adhesive groove 131 is disposed adjacent to an edge of the PV panel 200, and the second rectangular adhesive groove 132 is disposed along the outer periphery of the opening of the mounting recess 120. In some embodiments, a distance between an outer edge of the first rectangular adhesive groove 131 and an outer edge of the PV panel 200 is not greater than 10 mm, for example, 2 mm, 4 mm, 6 mm, 8 mm, or other suitable values. A distance between an inner edge of the second rectangular adhesive groove 132 and the opening of the mounting recess 120 is also not greater 10 mm, for example, 2 mm, 4 mm, 6 mm, 8 mm, or other suitable values.

In some embodiment, a width of the first rectangular adhesive groove 131 and a width of the second rectangular adhesive groove 132 are both not greater than 5 mm, for example, 2 mm, 3 mm, 4 mm, 5 mm, or other suitable values. A depth of the first rectangular adhesive groove 131 and a depth of the second rectangular adhesive groove 132 are also both not greater than 5 mm, for example, 2 mm, 3 mm, 4 mm, 5 mm, or other suitable values. In this way, the PV panel 200 is securely and stably fixed to the bottom housing 100, while the amount of the adhesive required is minimized, thereby reducing the material costs.

In some embodiments, a cross-section of the at least one adhesive groove 130 is one of an arc shape, a trapezoidal shape, a V shape, and a rectangular shape. Adopting these shapes provides multiple advantages. First, during an adhesive application process, adhesive naturally flows toward the bottom of the at least one adhesive groove 130, thereby enhancing the bonding strength and uniformity. Second, for manufacturing processes that require demolding, such design of the at least one adhesive groove 130 facilitates easier removal of a molded product from a mold. Such a groove wall of the at least one adhesive groove 130 has a certain draft angle, a friction between the bottom housing 100 after being molded and a corresponding side wall of the mold is reduced, which lowers demolding difficulty and improves production efficiency.

Please refer to FIG. 2, in some embodiments, the bottom housing 100 further includes at least one adhesive overflow groove 133, and the at least one adhesive overflow groove 133 is communicated with the at least one adhesive groove 130. The at least one adhesive overflow groove 133 is configured to receive excess adhesive that overflows from the at least one adhesive groove 130 during an adhesive application and pressing processes, thereby effectively preventing the excess adhesive from spreading and contaminating a light-receiving surface of the PV panel 200 or affecting an overall appearance of the PV panel 200. Furthermore, the at least one adhesive overflow groove 133 includes adhesive overflow grooves 133, and the adhesive overflow grooves 133 are spaced apart along a circumferential direction of the at least one adhesive groove 130, allowing excess adhesive at different locations to be collected and enabling a more stable and reliable adhesive process.

In some embodiments, a depth of the at least one adhesive overflow groove 133 is not greater than a depth of the at least one adhesive groove 130. Optionally, the depth of the at least one adhesive overflow groove 133 is less than the depth of the at least one adhesive groove 130, so that when the adhesive is in a flowable state, the adhesive first fills the at least one adhesive groove 130, and only the excess adhesive overflows into the at least one adhesive overflow groove 133. Such arrangement saves adhesive material to a certain extent.

Figure 4:
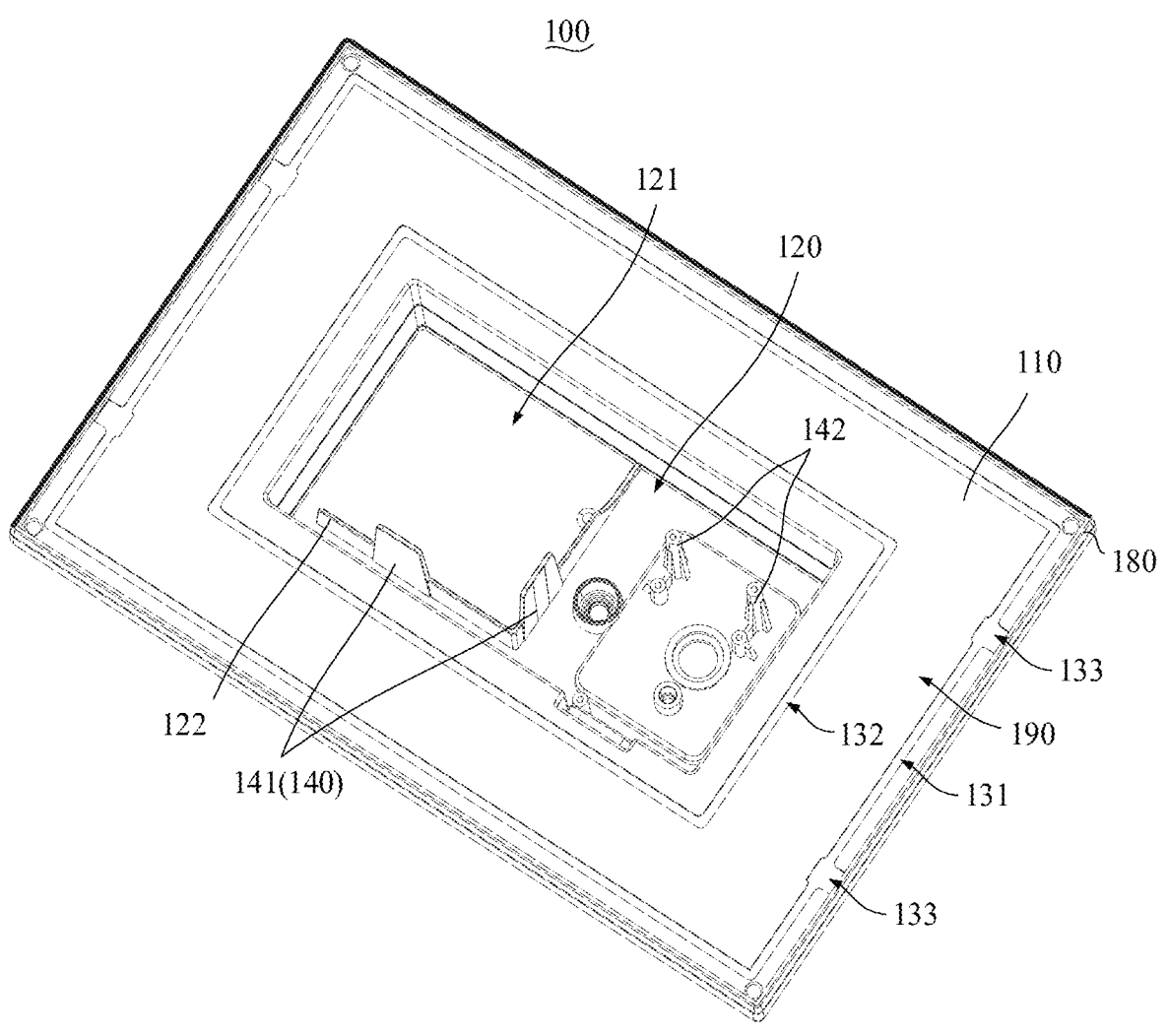
FIG. 4 is a structural schematic diagram of a bottom housing according to one embodiment of the present disclosure.

Please refer to FIG. 4, in some embodiments, a support structure 140 protrudes from a bottom wall of the mounting recess 120, and a top portion of the support structure 140 abuts against a lower surface of the PV panel 200. In this way, the support structure 140 provides rigid support to the central portion of the PV panel 200 having a relatively large area, preventing deformation of the PV panel 200 during a process of bonding to the mounting surface 110 under external forces.

Figure 3:
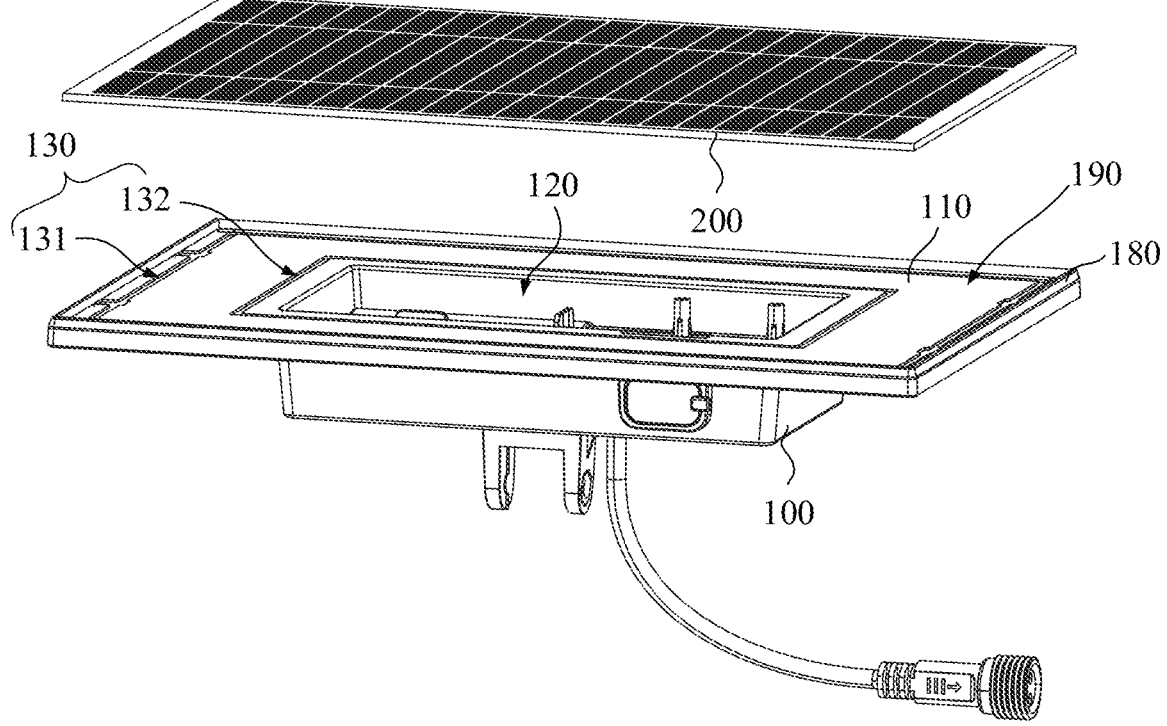
FIG. 3 is a second exploded schematic diagram of the solar PV panel according to one embodiment of the present disclosure

Please refer to FIGS. 2-4, in some embodiments, the bottom housing 100 further includes a protruding plate 122, the protruding plate 122 is connected to a bottom wall of the mounting recess 120 to define a battery compartment 121 for accommodating the at least one battery 400. The support structure 140 includes at least one support plate 141, the at least one support plate 141 is connected to a top portion of the protruding plate 122, and a top surface of the at least one support plate 141 abuts against the lower surface of the PV panel 200. In some configurations, the at least one support plate 141 includes two or more support plates 141, and extending directions of the two or more support plates 141 are different, thereby providing support to the PV panel 200 at different locations. For example, the protruding plate 122 and side walls of the mounting recess 120 together define the battery compartment 121, and two support plates 141 are provided and arranged perpendicular to each other. Optionally, the two support plates 141 are disposed at a central region of the protruding plate 122 near the opening of the mounting recess 120, so that the two support plates 141 provide support to the PV panel 200 at a central portion of the bottom housing 100 near the opening of the mounting recess 120.

In some embodiments, the support structure 140 includes at least one support post 142, a bottom portion of the at least one support post 142 is connected to the bottom wall of the mounting recess 120, and a top portion of the at least one support post 142 abuts against the lower surface of the PV panel 200. The at least one support post 142 includes two or more supporting posts 142, thereby supporting the PV panel 200 at different locations. Specifically, the two or more support posts 142 are spaced apart from the two or more support plates 141, such that the two or more support posts 142 and the two or more support plates 141 respectively support different regions of the PV panel 200.

Please refer to FIG. 4, as an illustrative example, the at least one battery 400 and the circuit board 500 are spaced apart from each other in a length direction of the mounting recess 120. The two support plates 141 are disposed around a peripheral side of the battery 400, two support posts 142 are provided, and the two support posts 142 are disposed on one side of the circuit board 500. In this way, the two support plates 141 and the two support posts 142 are spaced apart in the length direction of the mounting recess 120, such that the two support plates 141 and the two support posts 142 support different regions of the PV panel 200 in a length direction thereof. In addition, the two support plates 141 and the two support posts 142 are further disposed apart from each other in a width direction of the mounting recess 120, thereby allowing the two support plates 141 and the two support posts 142 to support different regions of the PV panel 200 in a width direction thereof.

To facilitate mounting of the circuit board 500, the bottom wall of the mounting recess 120 include at least one mounting post, the at least one mounting post extends upward, and the circuit board 500 is fixed to the at least one mounting post via crews, so as to fix within the mounting recess 120. To improve structural strength of both the at least one mounting post and the two support posts 140, reinforcing ribs are disposed between the at least one mounting post and the two support posts 140.

In some embodiments, the bottom housing 100 further includes a charging interface 150, and the charging interface 150 is electrically connected to the circuit board 500. Under conditions where ambient light intensity is insufficient or duration of sunlight is too short, an external power source is connected via the charging interface 150 to charge the at least one battery 400, thereby ensuring continuous and stable operation of the solar PV panel device and preventing disruption of normal use due to insufficient power.

Figure 5:
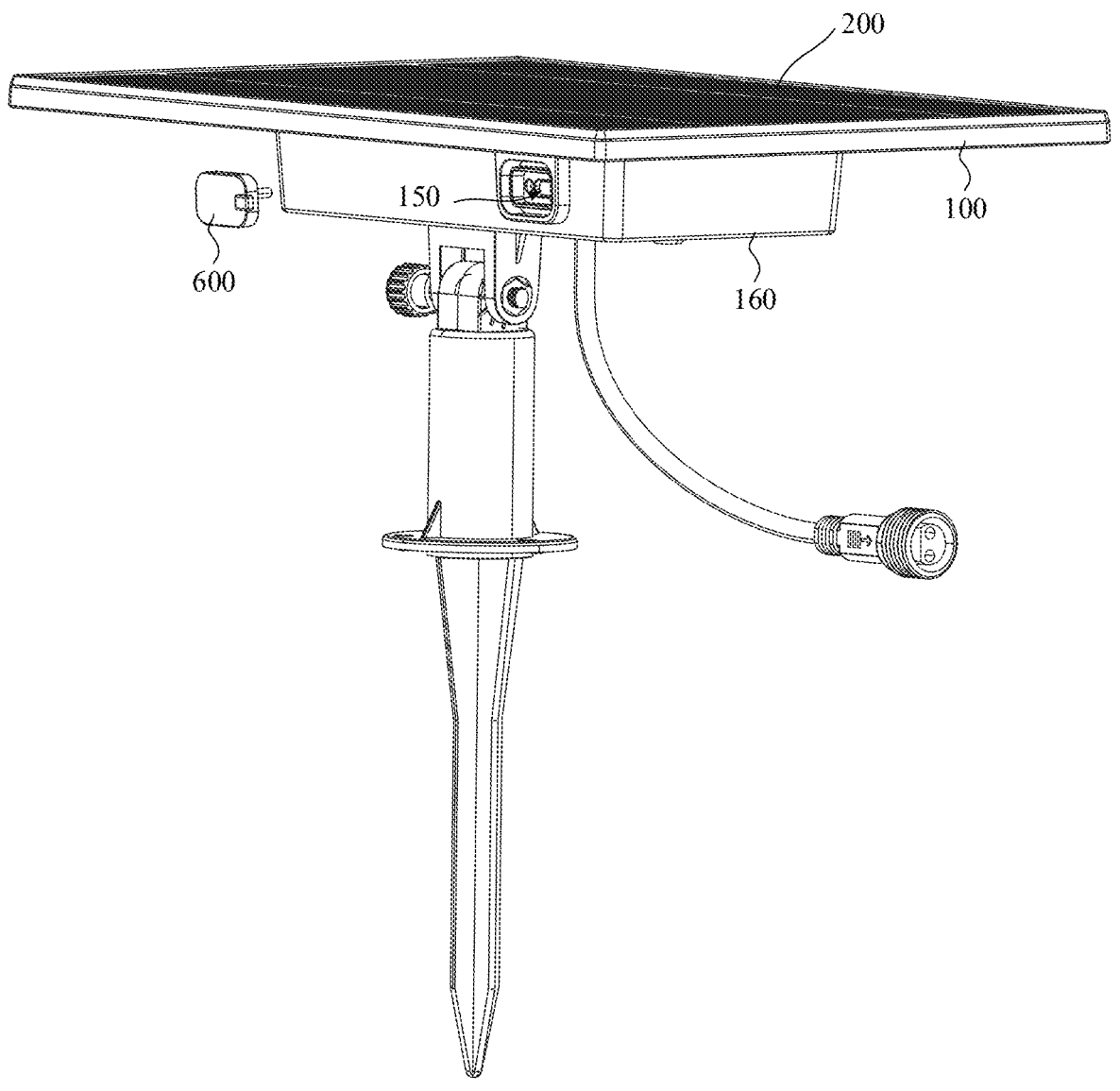
FIG. 5 is a structural schematic diagram of the PV panel device according to the present disclosure.

Please refer to FIG. 5, to enhance service life of internal electronic components of the solar PV panel device 1, the solar PV panel device 1 further includes a flexible sealing member 600, and the flexible sealing member 600 is configured to close or open the charging interface 150. When additional power is needed, a user removes the flexible sealing member 600 to expose the charging interface 150 for charging. When charging is not required, the flexible sealing member 600 is inserted into the charging interface 150 to provide a sealed enclosure, effectively preventing ingress of moisture into the mounting recess 120 and avoiding corrosion of the electronic components disposed therein. Specifically, the flexible sealing member 600 is made of silicone, rubber, or other suitable materials.

Please refer to FIG. 2, to enhance stability of the PV panel 200 mounted on the bottom housing 100, the mounting surface 110 further includes a retaining wall 180 disposed radially outward of the at least one adhesive groove 130. The retaining wall 180 cooperates with the mounting surface 110 to define an assembly groove 190 for accommodating the PV panel 200. Specifically, when the PV panel 200 is disposed in the assembly groove 190, a top surface of the PV panel 200 is flush with or slightly lower than a top surface of the retaining wall 180. In this way, the PV panel 200 is securely mounted on the bottom housing 100, effectively preventing loosening or shifting caused by external factors, while also providing a smooth and aesthetically pleasing overall appearance, thereby improving overall quality of the solar PV panel device.

Please refer to FIG. 1, in some embodiments, the solar PV panel device 1 further includes a transmission line, the transmission line is electrically connected to the circuit board 500 and the at least one battery 400. In this way, the PV panel 200 converts light energy into electrical energy, the electrical energy is stored in the at least one battery 400 and is then transmitted to external devices via the transmission line. The external devices may include, for example, street lights, garden lights, loudspeakers, fans, etc. During operation, the PV panel 200 converts received light energy into the electrical energy and stores the electrical energy in the at least one battery 400. The electrical energy stored in the at least one battery 400 is transmitted to various external devices through the transmission line. The circuit board 500 is configured to adjust output voltage according to requirements of the various external devices. Specifically, the circuit board 500 includes an internal voltage regulation circuit configured regulate voltage output from the at least one battery 400 within a suitable range. Additionally, the circuit board 500 provides both voltage and current regulation, thereby reducing fluctuations that may damage the external devices and extending service life thereof. Furthermore, the user may configure time parameters on the circuit board 500 to control duration of power supply from the at least one battery 400, improving convenience and energy management efficiency.

Based on the above, according to the solar PV panel device 1 of the present embodiment, an overall housing structure of the solar PV panel device 1 is generally formed by the bottom housing 100 and the PV panel 200. The bottom housing 100 is manufactured by an integrally molded process, which may significantly enhance production efficiency, effectively reduce manufacturing costs, and ensure overall structural stability and uniformity of the bottom housing 100. The bottom housing 100 includes the mounting recess 120, and the at least one battery 400 and the circuit board 500 are disposed in the mounting recess 120. The PV panel 200 is securely fixed to the mounting surface 110 of the bottom housing 100 via the at least one adhesive body. Such fixation method not only simplifies an assembly operation, but also ensures a tight and firm connection between the PV panel 200 and the bottom housing 100. Furthermore, the PV panel 200 covers the opening of the mounting recess 120, thereby providing effective protection for electronic components, such as the at least one battery 400 and the circuit board 500 disposed in the mounting recess 120. Such protection reduces exposure of the electronic components to external factors, such as dust and moisture, thereby prolonging service life of these electronic components.

Same or similar reference numerals in the drawings of the embodiments of the present disclosure correspond to the same or similar components. In the description of the present disclosure, it should be understood that orientations or working position relationships indicated by terms "upper", "lower", "left", "right", etc. are only for ease of description of the present disclosure and simplified description, rather than indicating or implying that the referred device or element must have a specific orientation, and is constructed and operated in a specific orientation, so the terms describing the working position relationships in the accompanying drawings are only used for exemplary description and cannot be understood as a limitation to the present disclosure, and for those who skilled in the art, specific meanings of above terms may be understood according to specific situations.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A solar photovoltaic (PV) panel device, comprising:
a bottom housing; and
a PV panel;
wherein the bottom housing comprises a mounting surface and at least one adhesive groove, a central portion of the mounting surface is recessed inward to form a mounting recess, and the at least one adhesive groove is defined on the mounting surface and surrounds an outer periphery of an opening of the mounting recess;
wherein at least one adhesive body is disposed in the at least one adhesive grooves;
wherein the PV panel is fixed to the mounting surface via the at least one adhesive body and covers the mounting recess;
wherein a support structure protrudes from a bottom wall of the mounting recess, and a top portion of the support structure abuts against a lower surface of the PV panel;
wherein the solar PV panel further comprises at least one battery and a circuit board, the at least one battery and the circuit board are disposed in the mounting recess and are respectively electrically connected to the PV panel;
the bottom housing further comprises a protruding plate, the protruding plate is connected to a bottom wall of the mounting recess to define a battery compartment for accommodating the at least one battery; and
the support structure comprises at least one support plate, the at least one support plate is connected to a top portion of the protruding plate, and a top surface of the at least one support plate abuts against the lower surface of the PV panel.

2. The solar PV panel device according to claim 1, wherein the at least one adhesive groove forms a continuous loop.

3. The solar PV panel device according to claim 2, wherein the bottom housing further comprises at least one adhesive overflow groove, and the at least one adhesive overflow groove is communicated with the at least one adhesive groove.

4. The solar PV panel device according to claim 3, wherein the at least one adhesive overflow groove comprises adhesive overflow grooves, and the adhesive overflow grooves are spaced apart along a circumferential direction of the at least one adhesive groove.

5. The solar PV panel device according to claim 3, wherein a depth of the at least one adhesive overflow groove is not greater than a depth of the at least one adhesive groove.

6. The solar PV panel device according to claim 1, wherein the PV panel is rectangular, and the at least one adhesive groove is a rectangular adhesive groove corresponding thereto.

7. The solar PV panel device according to claim 6, wherein the at least one adhesive groove comprises two adhesive grooves, and the two adhesive grooves comprise a first rectangular adhesive groove and a second adhesive groove; and
the first rectangular adhesive groove and the second rectangular adhesive groove are concentrically arranged and spaced apart from each other.

8. The solar PV panel device according to claim 7, wherein a distance between an outer edge of the first rectangular adhesive groove and an outer edge of the PV panel is not greater than 10 mm.

9. The solar PV panel device according to claim 7, wherein a distance between an inner edge of the second rectangular adhesive groove and the opening of the mounting recess is not greater than 10 mm.

10. The solar PV panel device according to claim 1, wherein the support structure comprises at least one support post, a top portion of the at least one support post abuts against the lower surface of the PV panel.

11. The solar PV panel device according to claim 1, wherein the bottom housing further comprises a charging interface, and the charging interface is electrically connected to the circuit board.

12. The solar PV panel device according to claim 11, wherein the solar PV panel device further comprises a flexible sealing member, and the flexible sealing member is configured to close or open the charging interface.

13. The solar PV panel device according to claim 1, wherein the mounting surface further comprises a retaining wall disposed radially outward of the at least one adhesive groove; and
the retaining wall cooperates with the mounting surface to define an assembly groove for accommodating the PV panel.

14. The solar PV panel device according to claim 13, wherein an upper surface of the PV panel does not protrude above an upper surface of the retaining wall.

15. The solar PV panel device according to claim 1, wherein a cross-section of the at least one adhesive groove is one of an arc shape, a trapezoidal shape, a V shape, and a rectangular shape.

* * * * *